US012491461B2

(12) United States Patent
Bruce et al.

(10) Patent No.: US 12,491,461 B2
(45) Date of Patent: Dec. 9, 2025

(54) FILTER SCREEN FOR OEM FILTER

(71) Applicants: Jerry A. Bruce, Greer, SC (US); James C. Brown, Campobello, SC (US)

(72) Inventors: Jerry A. Bruce, Greer, SC (US); James C. Brown, Campobello, SC (US)

( * ) Notice: Subject to any disclaimer, the term of this patent is extended or adjusted under 35 U.S.C. 154(b) by 509 days.

(21) Appl. No.: 17/686,533

(22) Filed: Mar. 4, 2022

(65) Prior Publication Data
US 2022/0280894 A1    Sep. 8, 2022

Related U.S. Application Data

(60) Provisional application No. 63/156,526, filed on Mar. 4, 2021.

(51) Int. Cl.
*B01D 46/10* (2006.01)
*B01D 46/00* (2022.01)
*B01D 46/62* (2022.01)

(52) U.S. Cl.
CPC ......... *B01D 46/10* (2013.01); *B01D 46/0002* (2013.01); *B01D 46/0038* (2013.01); *B01D 46/62* (2022.01); *B01D 2275/10* (2013.01)

(58) Field of Classification Search
None
See application file for complete search history.

(56) References Cited

U.S. PATENT DOCUMENTS

| 4,265,647 | A | | 5/1981 | Donachiue | |
|---|---|---|---|---|---|
| 4,277,267 | A | * | 7/1981 | Posner | B01D 46/10 55/494 |
| 4,340,402 | A | * | 7/1982 | Catron | B01D 46/10 55/501 |
| 4,372,763 | A | * | 2/1983 | Champlin | B01D 46/10 55/501 |
| 5,730,770 | A | | 3/1998 | Greisz | |
| 5,797,973 | A | | 8/1998 | Dudrey et al. | |
| 5,858,044 | A | | 1/1999 | Nepsund et al. | |
| 6,110,260 | A | * | 8/2000 | Kubokawa | B01D 46/10 96/414 |
| 6,293,983 | B1 | * | 9/2001 | More | B01D 46/62 55/491 |
| 6,918,940 | B1 | * | 7/2005 | Lackey | B01D 46/10 55/501 |
| 8,323,384 | B2 | | 12/2012 | Derstler et al. | |
| 9,789,430 | B2 | | 10/2017 | Jackson | |
| 10,024,276 | B2 | | 7/2018 | Winters | |

(Continued)

FOREIGN PATENT DOCUMENTS

WO    WO1999042719    5/2003

OTHER PUBLICATIONS

Amazon.com, https://www.amazon.com/FILTERWEARS-Pre-Filter-Polaris-Filters-1240822/dp/B01IU78GOG, Jan. 6, 2021.

*Primary Examiner* — Robert Clemente
(74) *Attorney, Agent, or Firm* — Offit Kurman; Douglas L. Lineberry

(57) ABSTRACT

Described herein is a filter screen used to extend the life of OEM or other equipment filters by serving as a replaceable pre-filter that reduces wear and particulate build up in the OEM or other filter, as well as methods of using a filter screen to preserve filter integrity and extend filter life.

8 Claims, 7 Drawing Sheets

(56) References Cited

U.S. PATENT DOCUMENTS

| | | | |
|---|---|---|---|
| 10,343,095 B2 | 7/2019 | Jaganathan et al. | |
| 10,399,026 B2 | 9/2019 | Seo et al. | |
| 2003/0205039 A1* | 11/2003 | Terlson | B01D 46/10 55/497 |
| 2004/0118277 A1* | 6/2004 | Kim | B01D 46/50 95/57 |
| 2005/0044828 A1* | 3/2005 | Southland | B01D 46/10 55/495 |
| 2005/0050868 A1* | 3/2005 | Bugli | B01D 46/10 55/482 |
| 2006/0168925 A1* | 8/2006 | Whittemore | B01D 46/10 55/490 |
| 2007/0186894 A1* | 8/2007 | Disch | B01D 46/0005 181/204 |
| 2008/0236120 A1* | 10/2008 | Li | B01D 46/62 55/486 |
| 2009/0100809 A1* | 4/2009 | Baldwin, Jr. | B01D 39/2093 55/318 |
| 2012/0272829 A1* | 11/2012 | Fox | B01J 20/10 96/154 |
| 2012/0317944 A1* | 12/2012 | Lise | B01D 46/0001 55/501 |
| 2014/0109534 A1* | 4/2014 | Rahmathullah | B01D 46/0005 29/458 |
| 2015/0052864 A1 | 2/2015 | Jackson | |
| 2016/0206168 A1 | 7/2016 | Sobel | |
| 2019/0168154 A1* | 6/2019 | Knight | B01D 46/0005 |
| 2019/0242616 A1* | 8/2019 | Gregerson | F24F 13/28 |
| 2023/0381703 A1* | 11/2023 | Siegele | B01D 46/0005 |

* cited by examiner

FILTER SCREEN FOR OEM FILTER

TECHNICAL FIELD

The subject matter disclosed herein is generally directed to a filter screen used to extend the life of OEM or other equipment filters by serving as a replaceable pre-filter that serves to reduce wear and particulate build up in the OEM or other filter, as well as methods of using a filter screen to preserve filter integrity and extend filter life.

BACKGROUND

Maintaining Original Equipment Manufacturer (OEM) air filters on heavy machinery is a very necessary, time-intensive, and expensive task. OEM filters themselves are costly. Replacing same takes time as well as removes the equipment from service while the filter is being replaced. Further, if the filter is not changed, this may reduce the equipment's efficiency, as well as eventually cause damage to the equipment.

Depending on the OEM filter being replaced, downtime for filter replacement may take several hours to remove and reinstall an OEM filter. FIG. 5 shows an image of an OEM filter after use with no pre-filter in place. As FIG. 5 shows, fine debris has clogged almost all surface area of the filter, rendering it inoperable and requiring a replacement OEM filter to be purchased and installed. If left unchanged, the condition of the OEM filter can damage internal mechanisms such as inside condensing coils, cleaning of which may cost as much as $1,000.00 per instance.

Various filter mechanisms exist in industry. U.S. Pat. No. 5,797,973 provides an air filtration arrangement for use in gas streams. The arrangement employs a sleeve formed replaceable depth media filter used in conjunction with a rigid filter construct. U.S. Pat. Pub. No. 2015/0052864 provides a pre-filter wrap that covers the entire outer surface of a filter canister, unlike the current disclosure. U.S. Pat. No. 5,858,044 discloses a wrap that can be wrapped around the outer surface of a primary filter. U.S. Pat. Nos. 10,024,276 and 4,265,647 disclose a pre-filter positioned away and upstream from a primary filter. U.S. Pat. No. 10,399,026 discloses a long-life filter for automobiles employing an integral pre-filter/filter arrangement with the pre-filter configured to block fine particles. U.S. Pat. No. 10,343,095 discloses a composite filter media that employs a pre-filter layer.

However, the current disclosure does not entirely cover all exterior surfaces of an OEM filter but does directly contact and cover the OEM filter's outer surface while not being integral with same. What is needed in the art is a device and methods for improving OEM filter life and reducing costs associated with same. Accordingly, it is an object of the present disclosure to provide a filter screen to be used with an OEM filter to extend the OEM filter life.

Citation or identification of any document in this application is not an admission that such a document is available as prior art to the present disclosure.

SUMMARY

The above objectives are accomplished according to the present disclosure by providing a disposable filter screen. The disposable filter screen may include at least one filter lattice containing at least one layer of filter material, an outer boundary surrounding a periphery of the at least one filter lattice, at least one support lattice at least partially traversing the at least one filter lattice, and the filter screen is shaped to contact, lay over, and cover substantially all of an exposed filtration surface of a primary filter. Further, the filter screen may have at least two layers of filter material. Still, the filter screen may include a second filter lattice on an underside of the filter screen. Yet again, the first filter lattice and the second filter lattice may have different support lattice placement with respect to one another. Also, the filter screen may be shaped to fit within a cover plate securing the primary filter. Moreover, the filter material may include a substantially flat, porous sheet. Furthermore, the filter material may include at least one nonwoven, foam, fiber, fiberglass, metal, synthetic, plastic screen, formed plastic, woven or knitted material, cloth, polymer, or combinations of the above. Still again, the filter material may include at least one adsorbent and/or at least one catalyst material.

In a further embodiment, a method for protecting and prolonging life of equipment filters may be provided. The method may include removing a cover from a primary filter, placing a first filter screen over a primary filter, wherein the first filter screen may contact, lay over, and cover substantially all of an exposed filtration surface of the primary filter and fits within the cover for the primary filter, and replacing the cover over the first filter screen and the primary filter. Further, the method may include removing the cover from the primary filter, removing the first filter and replacing same with a second filter without removing the primary filter. Still further, the method may include releasing a clasp that maintains the filter screen in contact with the primary filter. Further yet, the method may include resecuring the clasp once the filter screen is inserted. Still again, the method may include forming a first filter lattice and a second filter lattice on the first filter screen wherein the first filter lattice and the second filter lattice have different support lattice placement with respect to one another. Yet further, the first filter screen may be formed as a substantially flat, porous sheet. Moreover, the method may include forming the first filter screen to have a filter material that comprises at least one: nonwoven, foam, fiber, fiberglass, metal, synthetic, plastic screen, formed plastic, woven or knitted material, cloth, polymer, or combinations of the above. Still yet again, the method may include forming the first filter screen to have a filter material that comprises at least one adsorbent and/or at least one catalyst material.

These and other aspects, objects, features, and advantages of the example embodiments will become apparent to those having ordinary skill in the art upon consideration of the following detailed description of example embodiments.

BRIEF DESCRIPTION OF THE DRAWINGS

An understanding of the features and advantages of the present disclosure will be obtained by reference to the following detailed description that sets forth illustrative embodiments, in which the principles of the disclosure may be utilized, and the accompanying drawings of which.

Figure 1:
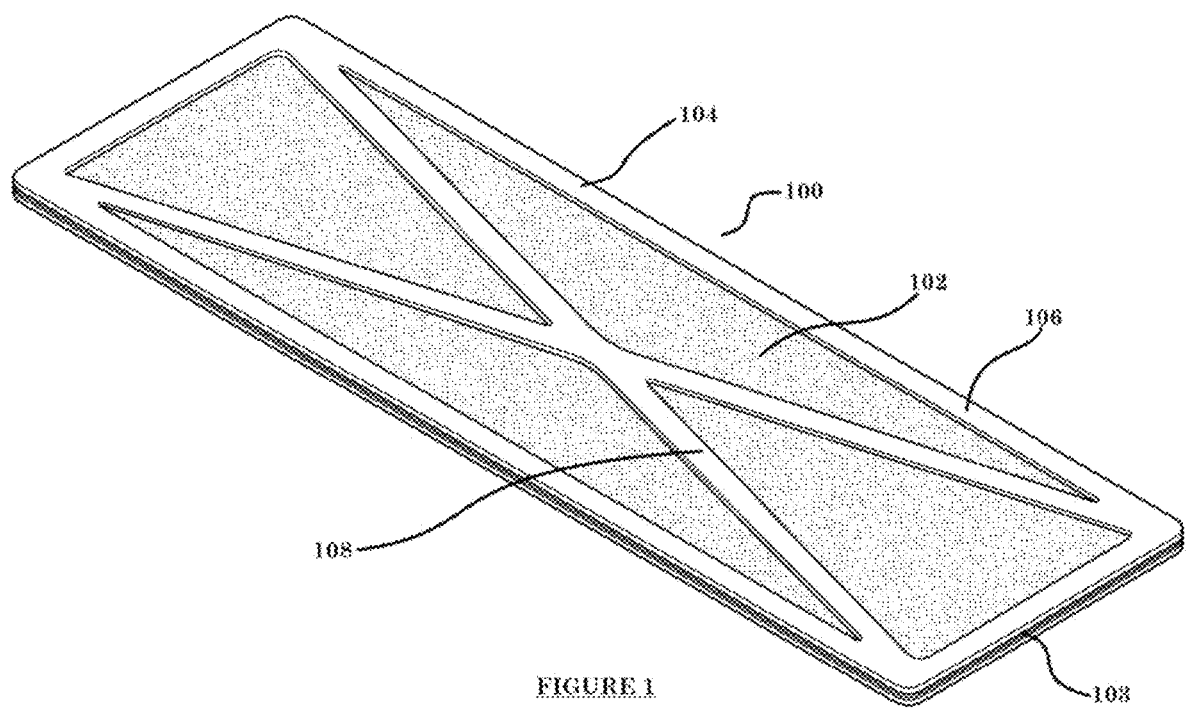
FIG. 1 shows one embodiment of a filter screen of the current disclosure.

The figures herein are for illustrative purposes only and are not necessarily drawn to scale.

DETAILED DESCRIPTION OF THE EXAMPLE EMBODIMENTS

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further embodiment includes from the one particular value and/or to the other particular value. The recitation of numerical ranges by endpoints includes all numbers and fractions subsumed within the respective ranges, as well as the recited endpoints. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the singular forms "a", "an", and "the" include both singular and plural referents unless the context clearly dictates otherwise.

As used herein, "about," "approximately," "substantially," and the like, when used in connection with a measurable variable such as a parameter, an amount, a temporal duration, and the like, are meant to encompass variations of and from the specified value including those within experimental error (which can be determined by e.g. given data set, art accepted standard, and/or with e.g. a given confidence interval (e.g. 90%, 95%, or more confidence interval from the mean), such as variations of +/−10% or less, +/−5% or less, +/−1% or less, and +/−0.1% or less of and from the specified value, insofar such variations are appropriate to perform in the disclosure. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

The term "optional" or "optionally" means that the subsequent described event, circumstance or substituent may or may not occur, and that the description includes instances where the event or circumstance occurs and instances where it does not.

As used herein, the terms "weight percent," "wt %," and "wt. %," which can be used interchangeably, indicate the percent by weight of a given component based on the total weight of a composition of which it is a component, unless otherwise specified. That is, unless otherwise specified, all wt % values are based on the total weight of the composition. It should be understood that the sum of wt % values for all components in a disclosed composition or formulation are equal to 100. Alternatively, if the wt % value is based on the total weight of a subset of components in a composition, it should be understood that the sum of wt % values the specified components in the disclosed composition or formulation are equal to 100.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s). Reference throughout this specification to "one embodiment", "an embodiment," "an example embodiment," means that a particular feature, structure or characteristic described in connection with the embodiment is included in at least one embodiment of the present disclosure. Thus, appearances of the phrases "in one embodiment," "in an embodiment," or "an example embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the disclosure. For example, in the appended claims, any of the claimed embodiments can be used in any combination.

The current disclosure is directed to a filter screen 100, see FIG. 1, that may be placed over an existing filter to extend life of an OEM or other filter by serving as a pre-filter to prevent particulate build-up and wear/damage to the OEM or other filter. Filter screen 100 may be placed in direct contact with an OEM or other filter and is shaped to match the shape of the OEM or other filter while covering all or substantially all of the exposed filter surface of the OEM filter. Filter screen 100 may include filter material 102 and filter lattice 104. Filter material 102 may be single ply or comprised of multiple plies 103 such as 2, 3, 4, 5, 6, or more filter plies. Filter lattice 104 may include outer boundary 106 as well as support lattices 108 that cross over/transverse/traverse filter material 102 in order to provide strength and structural integrity to filter screen 100. Filter material 102 may be formed into a substantially flat, porous sheet that may be made from nonwovens, foams, fibers, fiberglass, metal, synthetic, or plastic screens, formed plastics, woven or knitted materials, cloth, polymers (polypropylene, polyurethane, polyester, etc.) and or combinations of the above. Further, filter 100 may include adsorbents or catalysts such as charcoal to help remove odors/gaseous pollutants. Filter lattice 104 may be made from nonwovens, cardboard, synthetics, polymers, etc.

Figure 2:
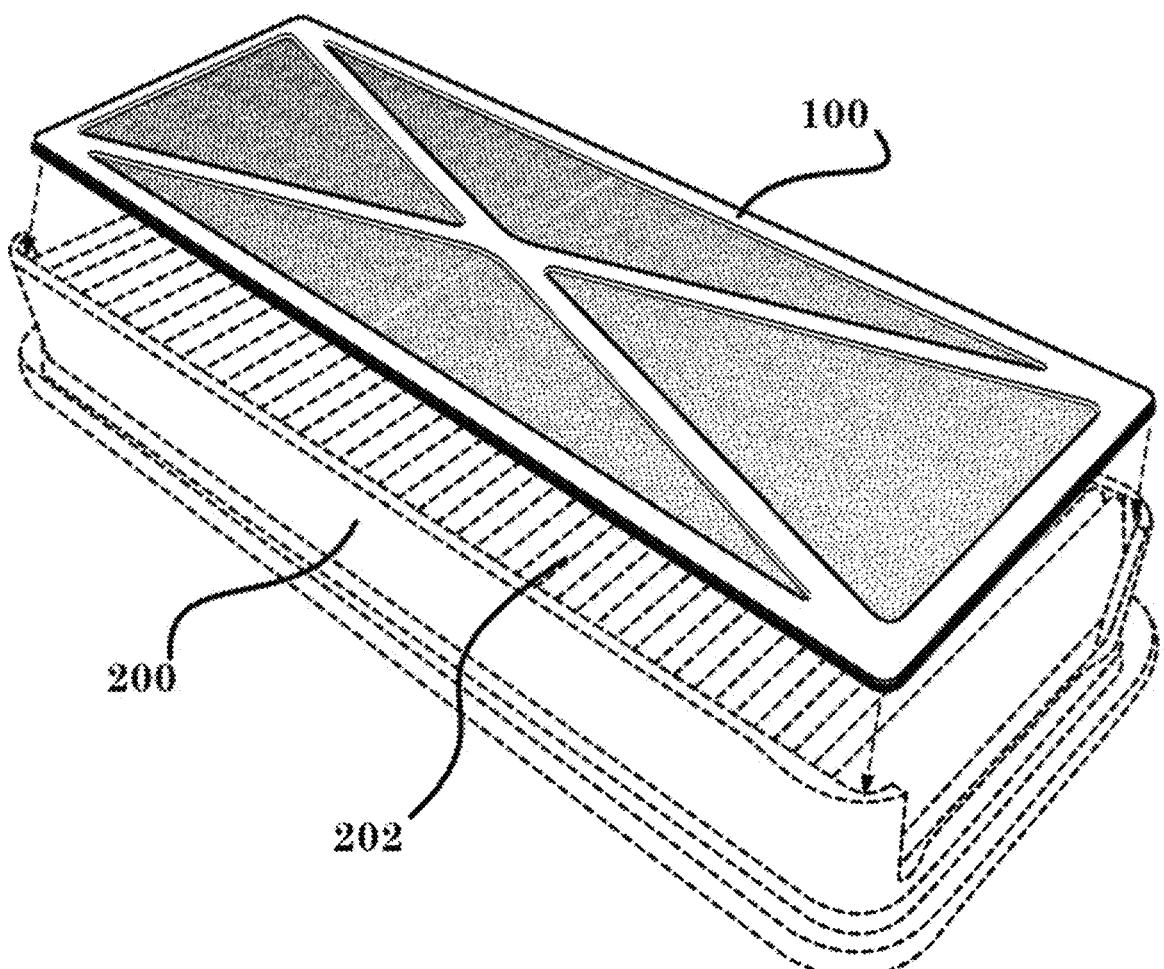
FIG. 2 shows a filter screen of the current disclosure being placed atop an existing OEM or other filter.

FIG. 2 shows filter screen 100 being placed atop an OEM or other equipment filter 200 such that filter screen 100 substantially and/or completely covers OEM or other equipment filter filtration surface 202. Preferably, filter screen 100 is placed in contact with the OEM or other filter to prevent debris from coming between the filter screen and OEM or other filter. This serves to shield the OEM or other filter from contamination, particulates, etc., while allowing filter screen 100 to act as a disposable prophylactic with respect to the OEM or other filter. Further, use of filter screen 100 greatly reduces wear on existing filters as well as significantly lowers maintenance time and costs. Replacing a filter screen of the current disclosure would take approximately 10 minutes as compared to possibly hours if an OEM filter were to be replaced. Instead, the current disclosure provides for a quick and efficient way of not only prolonging OEM life, possibly indefinitely, but also provides for efficient, time effective maintenance in order to keep machinery functioning at optimum levels.

Figure 3:
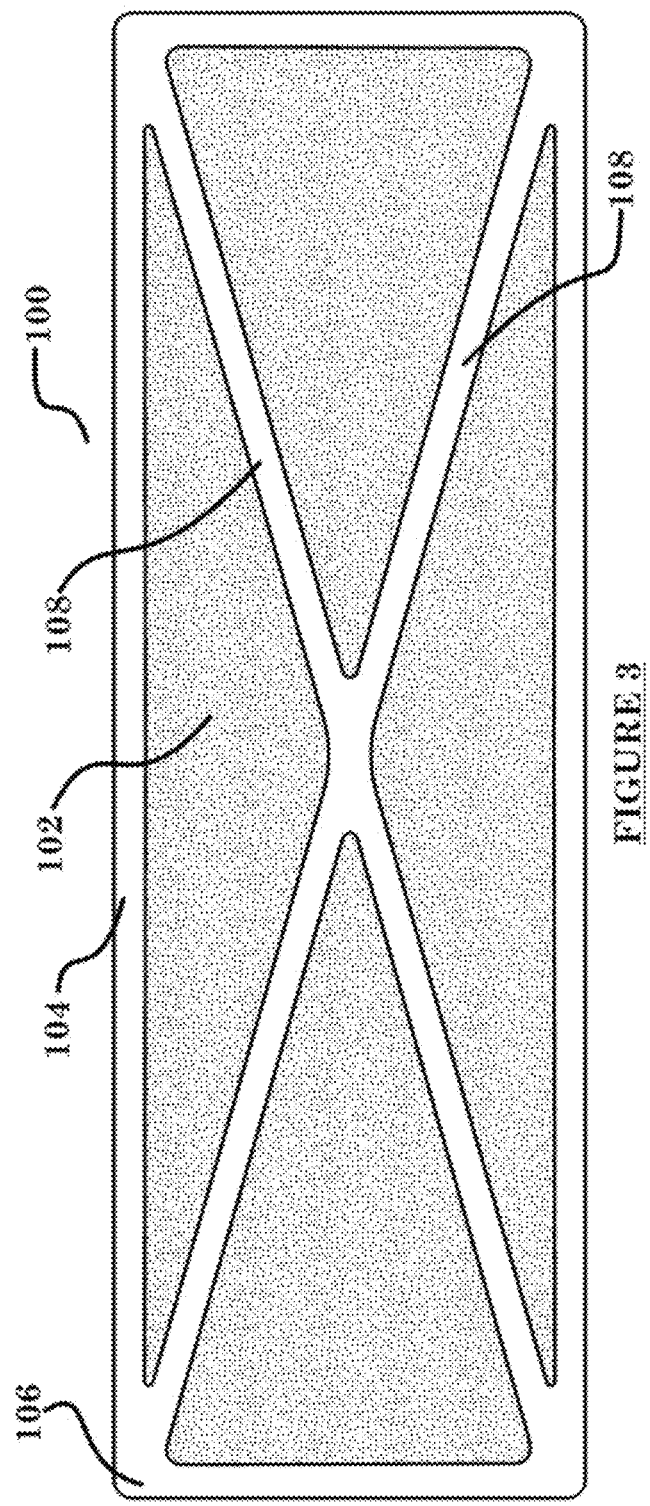
FIG. 3 shows a bottom view of a filter screen of the current disclosure.
Figure 4:
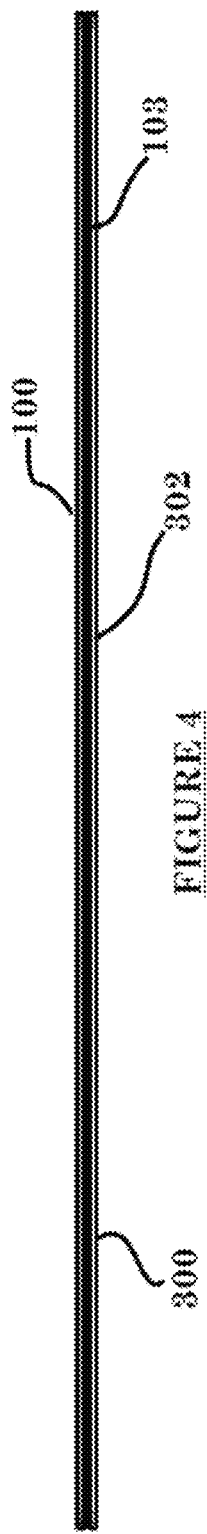
FIG. 4 shows a side view of a filter screen of the current disclosure.
Figure 5:
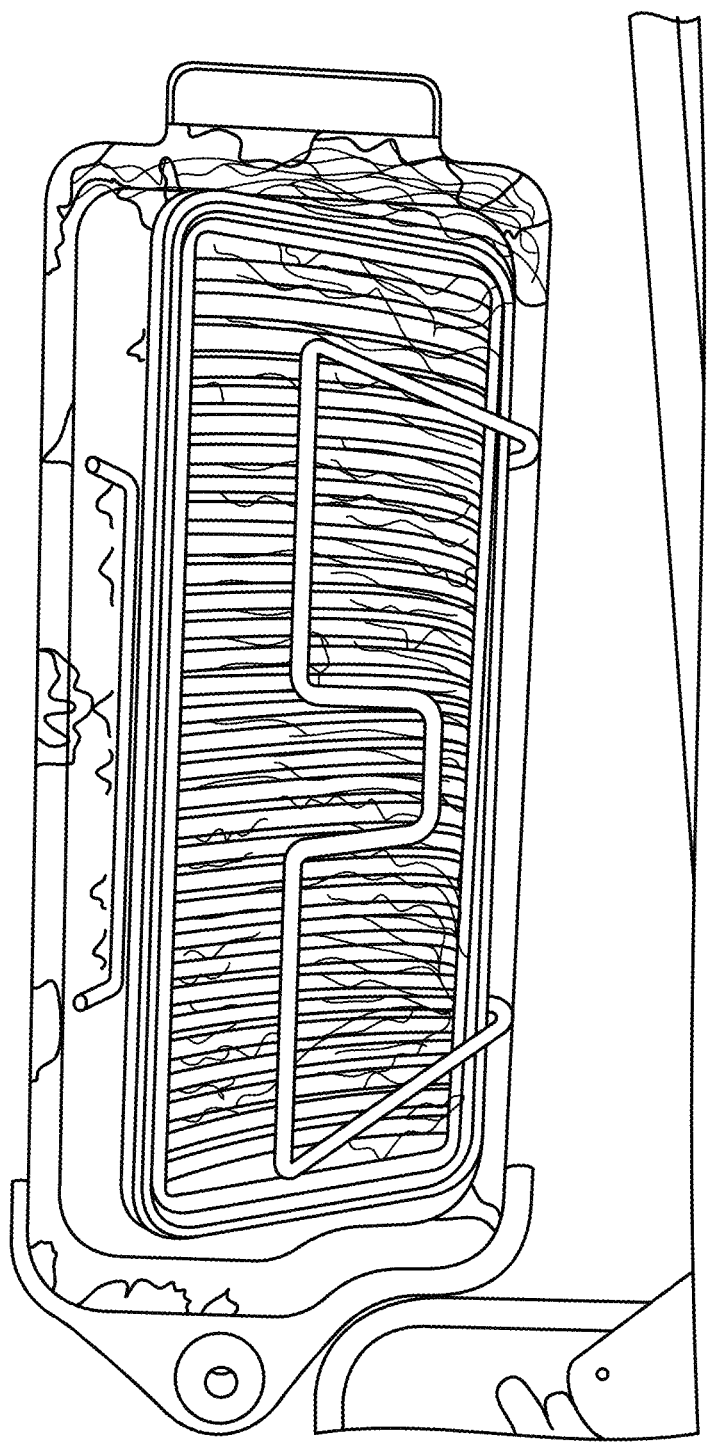
FIG. 5 shows a clogged OEM filter with no filter screen in place.

FIG. 3 shows a bottom view of filter screen 100. FIG. 4 shows a side view of filter screen 100. As FIG. 4 shows, filter screen 100 may comprise filter lattice underside 300 on filter screen bottom 302, such that both sides of filter screen 100 have a filter lattice to improve strength and stability. The two, different filter lattices may have the same lattice composition, i.e., same appearance/structure, or the two lattices may differ in appearance/structure from one another. By changing the placement of the support lattices from the upper surface to the lower surface, additional strength and stability may be achieved.

Figure 6:
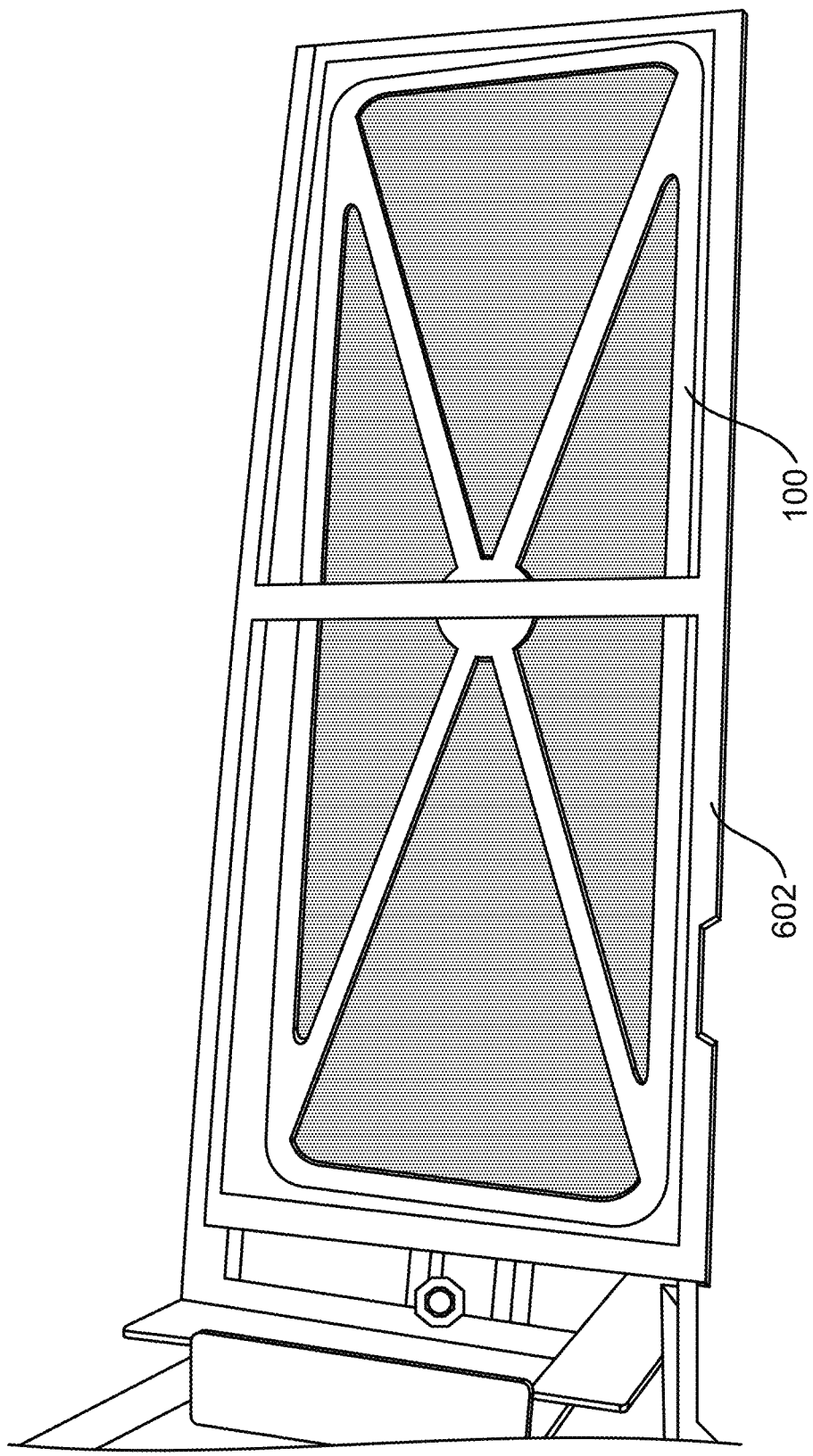
FIG. 6 shows a filter screen engaged with a cover plate for machinery.
Figure 7:
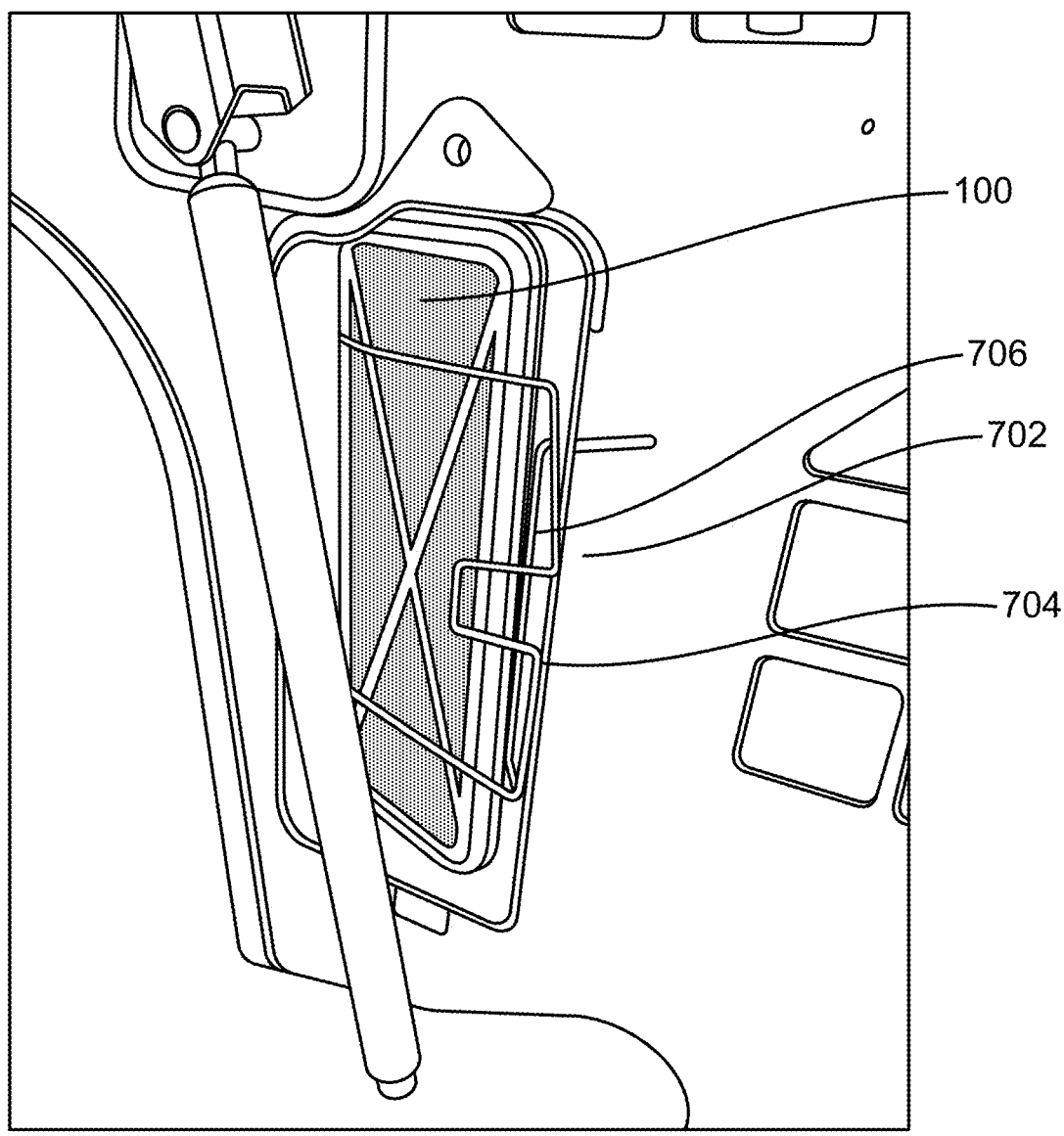
FIG. 7 shows a filter screen in place on a vehicle.

FIG. 6 shows filter screen 100 engaged with a cover plate 602 for machinery, in this case a KUBOTA SLV-95-2S skid steer. FIG. 7 shows a filter screen 100 in place on a vehicle 702, such as a KUBOTA SLV-95-2S skid steer. Further, filter screen 100 may be further held in place via a clasp or holder 704 that engages or hooks to an engagement member 706. Here, filter screen 100 is shaped to not only cover the OEM or other filter but to also fit within the cover plate used to secure the OEM or other filter in place.

Installation of the filter screen 100 is possible for both interior and exterior filters and is straightforward in both instances. For changing an outer filter, one simply removes the cover plate from the machinery, such as a KUBOTA SLV-95-2S skid steer, and removes a clasp or holder securing the pre-filter to the outer-facing surface of the OEM filter. One can then pull the filter from off the outer-facing surface of the OEM filter, insert a new filter onto the outer facing surface, re-secure the clasp or holder and replace the cover plate. For an inner filter, such as the inner filter KUBOTA SLV-95-2S skid steer, one can remove the cover plate via a bolt or screw, remove the pre-filter from the cover plate, insert a new pre-filter into the interior of the cover plate, and then replace the cover plate in position and bolt or screw same into engagement over the OEM filter outer-facing surface.

All patents, patent applications, published applications, and publications, databases, websites and other published materials cited herein are hereby incorporated by reference to the same extent as though each individual publication, published patent document, or patent application was specifically and individually indicated as being incorporated by reference.

Kits

Any of the filter screens or pre-filters described herein can be presented as a combination kit. As used herein, the terms "combination kit" or "kit of parts" refers to the filters, filter material, lattices and any additional components that are used to package, sell, market, deliver, and/or install or provide the filter screens or pre-filters. Such additional components include, but are not limited to packaging, blister packages, insertion tools, removal tools, and the like. When one or more of the filter screens or pre-filters described herein or a combination thereof are provided simultaneously, all materials may be included in the kit. When the filters, filter material, lattices and any additional components described herein or a combination thereof and/or kit components are not provided simultaneously, the combination kit can contain each part or other component separately. The separate kit components can be contained in a single package or in separate packages within the kit.

In some embodiments, the combination kit also includes instructions printed on or otherwise contained in a tangible medium of expression. The instructions can provide information regarding the filter screens or pre-filters and insertion/removal instructions, safety information, and/or recommended uses the filter screens or pre-filters contained therein. In some embodiments, the instructions can provide directions and protocols for inserting or removing the filter screens or pre-filters described herein. In some embodiments, the instructions can provide one or more embodiments of the methods described in greater detail elsewhere herein.

Various modifications and variations of the described methods, pharmaceutical compositions, and kits of the disclosure will be apparent to those skilled in the art without departing from the scope and spirit of the disclosure. Although the disclosure has been described in connection with specific embodiments, it will be understood that it is capable of further modifications and that the disclosure as claimed should not be unduly limited to such specific embodiments. Indeed, various modifications of the described modes for carrying out the disclosure that are obvious to those skilled in the art are intended to be within the scope of the disclosure. This application is intended to cover any variations, uses, or adaptations of the disclosure following, in general, the principles of the disclosure and including such departures from the present disclosure come within known customary practice within the art to which the disclosure pertains and may be applied to the essential features herein before set forth.

What is claimed is:

1. A method for protecting and prolonging life of equipment filters comprising;
    removing a cover from a primary filter;
    placing a first filter screen over the primary filter, wherein the first filter screen comprises a filter lattice containing a filter material configured to directly contact, lay over, and cover substantially all of an exposed filtration surface of the primary filter and fits within the cover for the primary filter; and
    replacing the cover over the first filter screen and the primary filter.

2. The method of claim 1, further comprising removing the cover from the primary filter, removing the first filter screen and replacing same with a second filter screen without removing the primary filter.

3. The method of claim 1, further comprising releasing a clasp that maintains the filter screen in direct contact with the primary filter.

4. The method of claim 3, further comprising resecuring the clasp once the filter screen is inserted.

5. The method of claim 1, further comprising forming a first filter lattice and a second filter lattice on the first filter screen wherein the first filter lattice and the second filter lattice have different support lattice placement with respect to one another.

6. The method of claim 1, further comprising forming the first filter screen to comprise a substantially flat, porous sheet.

7. The method of claim 1, further comprising forming the first filter screen to have a filter material that comprises at least one: nonwoven, foam, fiber, fiberglass, metal, synthetic, plastic screen, formed plastic, woven or knitted material, cloth, polymer, or combinations of the above.

8. The method of claim 1, further comprising forming the first filter screen to have a filter material that comprises at least one adsorbent and/or at least one catalyst material.

* * * * *